(12) United States Patent
Li et al.

(10) Patent No.: US 11,615,237 B2
(45) Date of Patent: Mar. 28, 2023

(54) PROCESSING METHOD FOR PRESENTING INDICATOR HIERARCHY AND CLASSIFICATION OF DATA IN SPREADSHEET

(71) Applicant: Hebei Institute of Science and Technology Information (Hebei Institute of STIS), Shijiazhuang (CN)

(72) Inventors: Yinsheng Li, Shijiazhuang (CN); Feng Wu, Shijiazhuang (CN); Chaozong Zhang, Shijiazhuang (CN); Yongchuan Nie, Shijiazhuang (CN); Hong Wang, Shijiazhuang (CN); Yan Ren, Shijiazhuang (CN); Miao Liu, Shijiazhuang (CN); Jinlong Zhang, Shijiazhuang (CN); Juan Chen, Shijiazhuang (CN); Die Zhang, Shijiazhuang (CN); Qiannan Jiang, Shijiazhuang (CN); Cong Zhang, Shijiazhuang (CN); Yuan Gao, Shijiazhuang (CN); Yinzhen Gao, Shijiazhuang (CN); Pengjie Wu, Shijiazhuang (CN)

(73) Assignee: Hebei Institute of Science and Technology Information (Hebei Institute of STIS)

(\*) Notice: Subject to any disclaimer, the term of this patent is extended or adjusted under 35 U.S.C. 154(b) by 0 days.

(21) Appl. No.: 17/704,105

(22) Filed: Mar. 25, 2022

(65) Prior Publication Data
US 2022/0215162 A1    Jul. 7, 2022

Related U.S. Application Data

(63) Continuation of application No. 17/526,023, filed on Nov. 15, 2021, now abandoned.

(30) Foreign Application Priority Data

Nov. 28, 2020  (CN) .......................... 202011365236.7

(51) Int. Cl.
G06F 40/18    (2020.01)
G06F 40/137   (2020.01)
(Continued)

(52) U.S. Cl.
CPC .......... *G06F 40/18* (2020.01); *G06F 16/2282* (2019.01); *G06F 40/137* (2020.01); *G06F 3/04842* (2013.01)

(58) Field of Classification Search
CPC ..... G06F 40/18; G06F 40/137; G06F 3/04842
See application file for complete search history.

(56) References Cited

U.S. PATENT DOCUMENTS 7,542,979 B2 \*  6/2009  Gupta ................... G06F 16/221
7,779,000 B2 \*  8/2010  Vigesaa ............ G06F 16/24556
                                                        707/722

(Continued)

*Primary Examiner* — Benjamin Smith
(74) *Attorney, Agent, or Firm* — Fei Hung Yang (57) ABSTRACT

The present disclosure provides a processing method for presenting an indicator hierarchy and classification of data in a spreadsheet. In this method, an indicator index structure S is constructed and a spreadsheet is used to present information based on user selections. The information includes an indicator and a hierarchy of the indicator, an indicator classification description and a hierarchy of the indicator classification description, an application scenario between an indicator and an indicator classification description, and other implicit attributes. This way, indicator descriptions can be neater and more readable. Data in a two-dimensional spreadsheet can be accurately presented and the spreadsheet is more comprehensible. In addition, indicators and indicator (Continued)

classification descriptions can be flexibly combined to present data in a more diversified, flexible, and personalized manner.

6 Claims, 5 Drawing Sheets

(51) Int. Cl.
    *G06F 3/04842*      (2022.01)
    *G06F 16/22*      (2019.01)

(56) References Cited

U.S. PATENT DOCUMENTS

| | | | | |
|---|---|---|---|---|
| 7,925,989 B2* | 4/2011 | Hofmann | ................ | G06F 40/14 |
| | | | | 715/713 |
| 8,055,995 B2* | 11/2011 | Sambandam | .......... | G06Q 10/00 |
| | | | | 715/219 |
| 8,127,223 B2* | 2/2012 | Becerra, Sr. | ........ | G06F 3/04815 |
| | | | | 715/214 |
| 8,548,992 B2* | 10/2013 | Abramoff | ............. | G06F 16/904 |
| | | | | 707/726 |
| 8,689,137 B2* | 4/2014 | McCormack | ......... | G06F 3/0481 |
| | | | | 715/810 |
| 8,949,819 B2* | 2/2015 | Allam | ...................... | G06F 8/36 |
| | | | | 717/171 |
| 9,244,899 B1* | 1/2016 | Greenbaum | .......... | G06Q 40/00 |
| 9,430,469 B2* | 8/2016 | Lam | ........................ | G06F 40/18 |
| 9,704,162 B2* | 7/2017 | Bhatia | .................... | G06Q 30/00 |
| 9,916,297 B1* | 3/2018 | Greenbaum | ........... | G06Q 40/00 |
| 10,445,707 B2* | 10/2019 | Grossmann | ................ | G06F 8/51 |
| 10,732,810 B1* | 8/2020 | Cohen | .................... | G06T 11/206 |
| 10,977,246 B2* | 4/2021 | Frantz | ..................... | G06F 16/26 |
| 2005/0267899 A1* | 12/2005 | Gupta | ................... | G06F 16/221 |
| 2007/0050322 A1* | 3/2007 | Vigesaa | ................. | G06F 40/103 |
| 2007/0055943 A1* | 3/2007 | McCormack | ......... | G06F 3/0481 |
| | | | | 707/999.01 |
| 2008/0282189 A1* | 11/2008 | Hofmann | .............. | G06F 40/106 |
| | | | | 715/793 |
| 2009/0063549 A1* | 3/2009 | Bhatia | .................... | G06Q 30/00 |
| | | | | 707/999.102 |
| 2009/0187815 A1* | 7/2009 | Becerra, Sr. | .......... | G06F 16/283 |
| | | | | 715/212 |
| 2012/0110515 A1* | 5/2012 | Abramoff | ............. | G06F 16/904 |
| | | | | 715/854 |
| 2012/0112997 A1* | 5/2012 | Becerra, Sr. | ........ | G06F 3/04815 |
| | | | | 345/156 |
| 2012/0159297 A1* | 6/2012 | Peters | ..................... | G06F 40/18 |
| | | | | 715/212 |
| 2013/0151313 A1* | 6/2013 | Sussman | ........... | G06Q 10/0631 |
| | | | | 705/7.31 |
| 2014/0089911 A1* | 3/2014 | Allam | ...................... | G06F 8/36 |
| | | | | 717/171 |
| 2015/0370433 A1* | 12/2015 | Lam | ........................ | G06F 16/00 |
| | | | | 715/771 |
| 2016/0132838 A1* | 5/2016 | Grossman | ................ | G06F 8/51 |
| | | | | 705/305 |
| 2017/0286455 A1* | 10/2017 | Li | .......................... | G06F 16/212 |
| 2019/0311034 A1* | 10/2019 | Gao | ........................ | H04L 43/0876 |
| 2020/0089794 A1* | 3/2020 | Frantz | ................. | G06F 16/2428 |
| 2021/0209559 A1* | 7/2021 | Prasad | ................. | G06Q 10/105 |
| 2021/0286845 A1* | 9/2021 | Dowler | ................. | G06F 16/248 |

\* cited by examiner 2-2 Industrial enterprises classified based on enterprise scales and registration types (2016)

|  | Number of enterprises | Number of enterprises with R&D projects | Number of enterprises with scientific organizations |
|---|---|---|---|
| Total | 14764 | 1701 | 1123 |
| 1. Enterprise scale-based classification |  |  |  |
| Large-sized | 348 | 168 | 134 |
| Medium-sized | 1694 | 386 | 289 |
| Small-sized | 12089 | 1133 | 694 |
| Micro-sized | 633 | 14 | 6 |

FIG. 1
--Prior Art--

| Indicator | Value | Data time |
|---|---|---|
| Number of large-sized enterprises | 348 | 2016 |
| Number of medium-sized enterprises | 1694 | 2016 |
| Number of small-sized enterprises | 12089 | 2016 |
| Number of mirco-sized enterprises | 633 | 2016 |
| Number of large-sized enterprises with R&D projects | 168 | 2016 |
| Number of medium-sized enterprises with R&D projects | 386 | 2016 |
| Number of small-sized enterprises with R&D projects | 14 | 2016 |
| Number of mirco-sized enterprises with R&D projects | 1133 | 2016 |
| Number of large-sized enterprises with scientific organizations | 134 | 2016 |
| Number of medium-sized enterprises with scientific organizations | 289 | 2016 |
| Number of small-sized enterprises with scientific organizations | 694 | 2016 |
| Number of mirco-sized enterprises with scientific organizations | 6 | 2016 |

FIG. 2
--Prior Art--

Initialize an indicator index structure S

Read information from I, C, D, and R databases based on selections of a user by using an indicator index structure constructor, to fill the structure S Iteratively extract information from the I, C, D, and R databases based on selections of the user by using a hierarchical classification result presentation device Render and present the extracted information to the user

FIG. 3

| IA area | CA area | RA area | SA area |
|---|---|---|---|
| Present an indicator unit in an I database by using a hierarchical tree | Present an indicator classification description unit in a C database by using a hierarchical tree | Present (1) a relationship between an indicator unit in the I database and an indicator classification description unit in the C database, (2) an implicit relationship such as a source, database, or spreadsheet, and (3) a relationship such as an application scenario between a hierarchy and a classification description | Present an indicator unit and indicator classification description unit that are selected by a user |

| IA area | CA area | RA area | SA area |
|---|---|---|---|
| Indicator X1<br>　Indicator X11 ✓<br>　Indicator X12<br>　Indicator X13<br>　Indicator X14<br>Indicator X2<br>　Indicator X21 ✓<br>　Indicator X22<br>　　Indicator X221 ✓<br>　Indicator X23 | Classification description Y1<br>　Classification description Y11<br>　Classification description Y12<br>　Classification description Y13<br>Classification description Y2<br>　Classification description Y21 ✓<br>　Classification description Y22<br>　　Classification description Y221 | (1) Relationship between an indicator in an I database and an indicator classification description in a C database<br>(2) Implicit relationship such as a source, database, or spreadsheet<br>(3) Relationship such as an application scenario between a hierarchy and a classification | Selected indicators:<br><br>Indicator X11 and classification descriptions Y21 and Y221<br><br>Indicator X21 and classification descriptions Y21 and Y221<br><br>Indicator X221 and classification descriptions Y21 and Y221 |

FIG. 7

|  | Indicator X11 | Indicator X21 | Indicator X22 | Indicator X221 |
|---|---|---|---|---|
| Classification description Y2 |  |  |  |  |
| Classification description Y21 |  |  |  |  |
| Classification description Y22 |  |  |  |  |

FIG. 8

PROCESSING METHOD FOR PRESENTING INDICATOR HIERARCHY AND CLASSIFICATION OF DATA IN SPREADSHEET

CROSS REFERENCE TO RELATED APPLICATION(S)

This patent application claims the benefit and priority of Chinese Patent Application No. 202011365236.7 filed on Nov. 28, 2020, the disclosure of which is incorporated by reference herein in its entirety as part of the present application.

TECHNICAL FIELD

The present disclosure pertains to the technical field of big data processing, and in particular, to a processing method for presenting an indicator hierarchy and classification of data in a spreadsheet.

BACKGROUND ART

Among diversified data sources involved in big data management, spreadsheet data files are commonly known.

Figure 1:
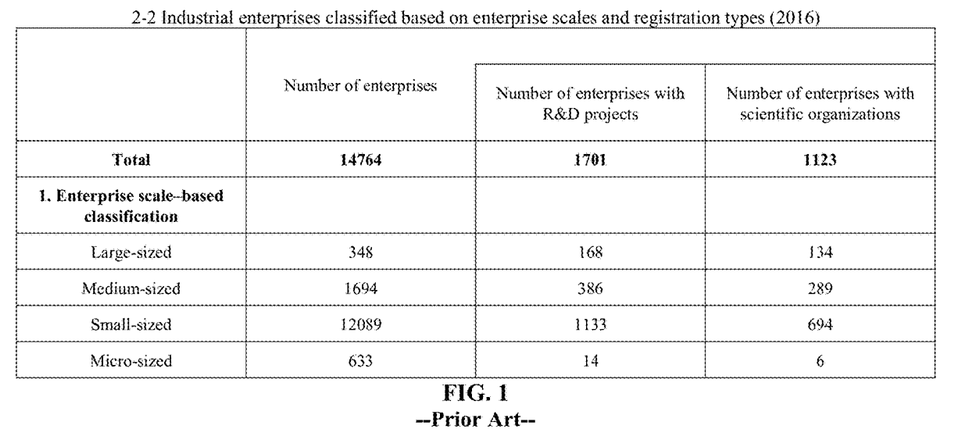
FIG. 1 is a diagram of a conventional spreadsheet that is used to present statistical data after manual processing according to the present disclosure.

Existing statistical data is mostly presented in the form of two-dimensional spreadsheets. Each value in the table must be understood based on the title of the spreadsheet and indicators of the value along the X-axis and Y-axis. As shown in FIG. 1, an indicator area of a spreadsheet can be divided into an X-axis area and a Y-axis area. Indicators in the X-axis area include "Number of enterprises", "#Number of enterprises with R&D projects", and "#Number of enterprises with scientific organizations". Indicators in the Y-axis area include "Total", "Large-sized", "Medium-sized", "Small-sized", and "Micro-sized". At present, a commonly used data presentation format is a direct combined from such as an XY (or YX) format. For example, a value of 348 is represented by a combination of indicators "Large-sized" and "Number of enterprises", which indicates a number of enterprises that are large in size when enterprise scale—based classification is involved. The value must be understood based on the spreadsheet to which the value belongs. If the value is understood only based on the indicators "Large-sized" and "Number of enterprises", classification information implied by the indicators can hardly be expressed in computing. In addition to "Large-sized", an enterprise may also be classified into a "Medium-sized", "Small-sized", or "Micro-sized" category in this example when enterprise scale—based classification is involved. The conventional indicator-based presentation format cannot accurately present indicator classification description information.

Figure 2:
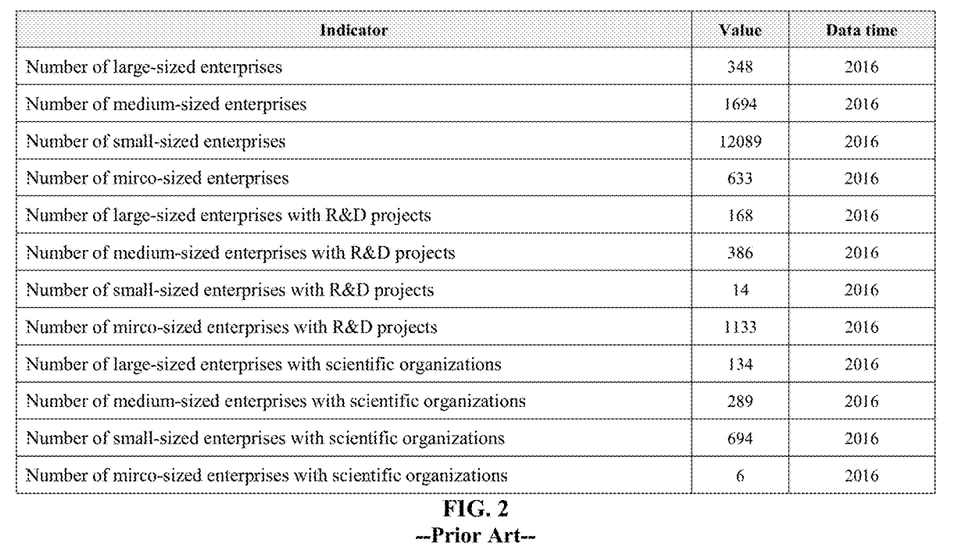
FIG. 2 is a diagram of a combined presentation of statistical data in the prior art.

Currently, spreadsheet data is often processed and presented by directly combining indicators along the X-axis and Y-axis. As shown in FIG. 2, "Number of large-sized enterprises" is a combination of "Large-sized" and "Number of enterprises", where "Number of enterprises" is an actual indicator while "Large-sized" is a classification description of the indicator "Number of enterprises". A new indicator that is obtained by directly using the XY (or YX) presentation format is not standard (or conventional). This may result in a long indicator name. In addition, the new indicator formed in such a way may be non-standard and inaccurate and has poor readability and comprehensibility. If there are multiple levels of hierarchical relations and inclusion relations between indicators, data may be hard to be expressed or may fail to be expressed. Specifically, when multiple data sources are involved in data merging, an indicator formed in such a way may not be qualified for constituting a uniform indicator database. This also hinders large-scale combination operations and exploration of implicit information such as relationships between indicators. As a result, data cannot be presented as required or flexibly combined.

SUMMARY

The present disclosure provides a processing method for presenting an indicator hierarchy and classification of data in a spreadsheet. This ensures a neater indicator description, an explicit indicator hierarchical relationship, and clearer and more accurate value presentation.

The technical solutions adopted by the present disclosure are as follows:

A processing method for presenting an indicator hierarchy and classification of data in a spreadsheet is provided. The processing method is implemented based on a D database that stores a value, an I database that stores an indicator unit, a C database that stores an indicator classification description unit, and an R database that stores an application scenario. The processing method includes the following steps:

A1: constructing an indicator index structure S;

A2: reading information from the I, C, D, and R databases based on selections of a user and filling the indicator index structure S by using an indicator index structure constructor;

A3: iteratively extracting information from the I, C, D, and R databases based on selections of the user by using a hierarchical classification result presentation device; and A4: rendering and presenting, to the user, the information extracted by the hierarchical classification result presentation device.

According to the processing method for presenting an indicator hierarchy and classification of data in a spreadsheet, the indicator index structure S in Step A1 includes an indicator area, an indicator classification description area, a relationship area, and a selected indicator area. The indicator area is an IA area that presents an indicator and a hierarchical relationship between indicators. The indicator classification description area is a CA area that presents an indicator classification description and a hierarchical relationship between indicator classification descriptions. The relationship area is an RA area that presents an application scenario between an indicator unit and an indicator classification description unit and implicit attributes such as a corresponding source, database, and spreadsheet. The selected indicator area is an SA area that presents an indicator and indicator classification description that are selected by the user.

According to the processing method for presenting an indicator hierarchy and classification of data in a spreadsheet, Step A2 specifically includes:

A21: initializing the indicator index structure S;

A22: reading an indicator unit from the I database and filling the IA area in the indicator index structure S with the indicator unit, to form a hierarchical tree of indicators for the user to select;

A23: reading, from the R database, a relationship that corresponds to an indicator i selected by the user and filling the RA area in the indicator index structure S with the relationship, to form an application scenario r;

A24: reading an indicator classification description c from the C database based on the relationship that is read from the R database and that corresponds to the indicator i, and filling the CA area in the indicator index structure S with the indicator classification description c, to form a hierarchical tree of indicator classification descriptions for the user to select; and A25: filling the SA area in the indicator index structure S based on the indicator i, indicator classification description c, and the application scenario r that are selected by the user.

According to the processing method for presenting an indicator hierarchy and classification of data in a spreadsheet, Step A3 specifically includes:

A31: initializing a data storage container matrix M;

A32: reading information about the SA area in the indicator index structure S;

A33: reading an indicator unit from the I database based on the indicator that is selected by the user in the SA area, and filling an indicator area along the X-axis in the matrix M with the indicator unit;

A34: reading relevant data from the D database based on the indicator unit in the indicator area along the X-axis in the matrix M, and generating a temporary data set DS1;

A35: reading an indicator classification description unit from the C database based on the indicator classification description that is selected by the user in the SA area, and filling an indicator classification description area along the Y-axis in the matrix M with the indicator classification description;

A36: reading relevant data from the D database based on the indicator classification description unit in the indicator classification description area along the Y-axis in the matrix M, and generating a temporary data set DS2; and A37: performing intersection on the temporary data sets DS1 and DS2 to obtain a matrix data set DS3, and filling the matrix M with the matrix data set DS3.

By adopting the preceding technical solution, the present disclosure has the following technical benefits:

Implicit information, such as hierarchies of indicators and indicator classification descriptions, in a two-dimensional spreadsheet in the present disclosure is explicitly presented. A standardized and hierarchical spreadsheet is obtained. Indicator descriptions are neater and more readable and comprehensible. Data in a two-dimensional spreadsheet can be accurately presented. In addition, indicators and indicator classification descriptions can be flexibly combined to present data in a more diversified, flexible, and personalized manner.

DETAILED DESCRIPTION OF THE EMBODIMENTS

The present disclosure will be further described in detail below with reference to the accompanying drawings and embodiments.

The present disclosure provides a processing method for presenting an indicator hierarchy and classification of data in a spreadsheet. The processing method is implemented based on data with attributes. In this method, an indicator index structure is constructed and a spreadsheet is used to present information based on user selections. The information includes a value, an indicator corresponding to the value and a hierarchy of the indicator, an indicator classification description and a hierarchy of the indicator classification description, an application scenario between an indicator and an indicator classification description, and other implicit attributes, depending on the personalized selection of the user. In this way, data in a two-dimensional spreadsheet is accurately presented.

The data in the two-dimensional spreadsheet in the present disclosure includes data on features, nouns, categories, and statistics. Granularized data is a value with value-specific attributes, including indicators, indicator classification descriptions, application scenarios and the like. An indicator is composed of an indicator name, a measurement unit, a time constraint, a space constraint, and an application constraint. An indicator unit is composed of an indicator and a hierarchical relationship of the indicator. An indicator classification description denotes a perspective from which an indicator is described. An indicator classification description unit is composed of an indicator classification description and a hierarchical relationship of the indicator classification description. An application scenario denotes a correspondence between an indicator unit and an indicator classification description unit in a specific two-dimensional spreadsheet, and information such as sources, databases, and spreadsheets corresponding to the two units.

All the attributes described above are separately stored in a value database, an indicator database, an indicator classification description database, and a relationship database. The value database is briefly referred to as a D database, which is used to store values, including X-axis values, Y-axis values, and numbers. The indicator database is briefly referred to as an I database, which is used to store indicator units. The indicator classification description database is briefly referred to as a C database, which is used to store indicator classification description units. The relationship database is briefly referred to as an R database, which is used to store application scenarios.

Figure 3:
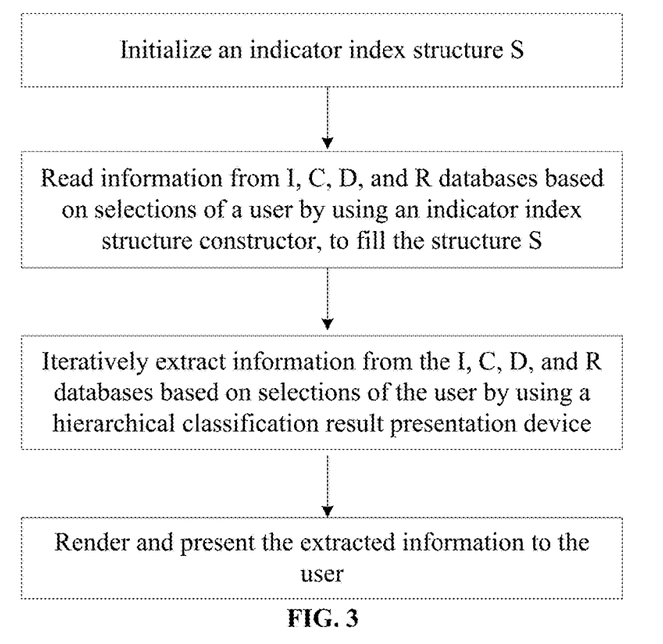
FIG. 3 is a flowchart of the present disclosure.

FIG. 3 is a flowchart of the processing method in the present disclosure. Specifically, the processing method includes the following steps:

A1: Constructing an indicator index structure S.

Figure 4:
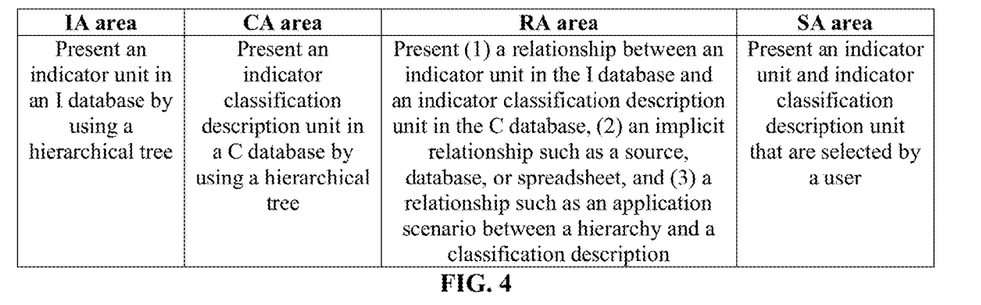
FIG. 4 is a schematic diagram of an indicator index structure S in Step A1 according to the present disclosure.

As shown in FIG. 4, the indicator index structure S includes an indicator area, an indicator classification description area, a relationship area, and a selected indicator area. The indicator area is briefly referred to as an IA area, which presents indicator units. In other words, the IA area presents indicators and hierarchical relationships of indicators. The indicator classification description area is briefly referred to as a CA area, which presents indicator classification description units. In other words, the CA area presents indicator classification descriptions and hierarchical relationships of indicator classification descriptions. The relationship area is briefly referred to as an RA area, which presents application scenarios between indicator units and indicator classification description units and implicit attributes such as corresponding sources, databases, and spreadsheets. The selected indicator area is briefly referred to as an SA area, which presents indicators and indicator classification descriptions that are selected by a user.

A2: Reading information from the I, C, D, and R databases based on selections of the user by using an indicator index structure constructor.

Figure 5:
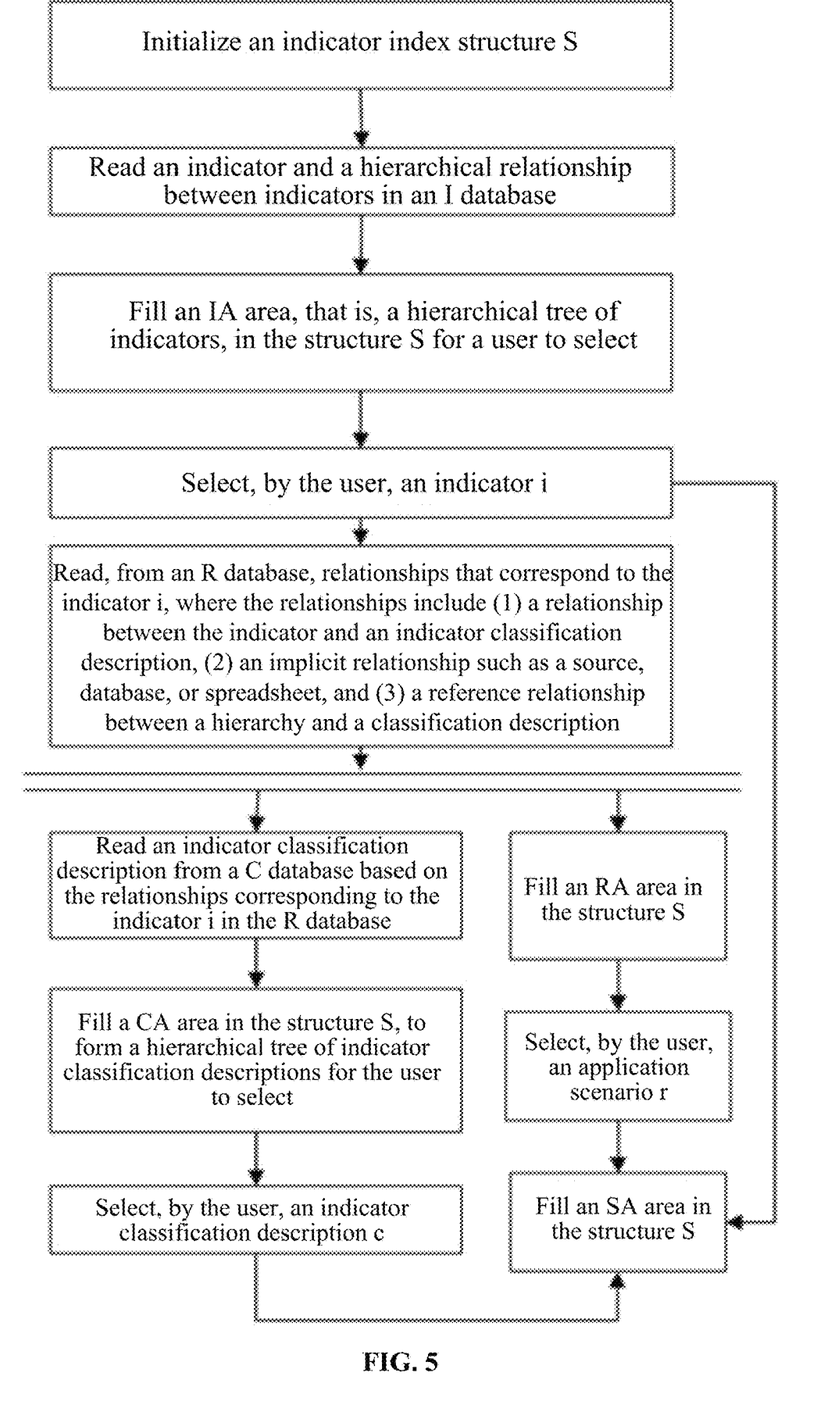
FIG. 5 is a flowchart of Step A2 according to the present disclosure.

As shown in FIG. 5, this step specifically includes the following sub steps:

A21: Initializing the indicator index structure S.

A22: Reading an indicator unit from the I database and filling the IA area in the indicator index structure S with the indicator unit, to form a hierarchical tree of indicators for the user to select.

A23: Reading, from the R database, a relationship that corresponds to an indicator i selected by the user and filling the RA area in the indicator index structure S with the relationship, to form an application scenario r.

A24: Reading an indicator classification description c from the C database based on the relationship that is read from the R database and that corresponds to the indicator i, and filling the CA area in the indicator index structure S with the indicator classification description c, to form a hierarchical tree of indicator classification descriptions for the user to select.

A25: Filling the SA area in the indicator index structure S based on the indicator i, indicator classification description c, and the application scenario r that are selected by the user.

Figure 7:
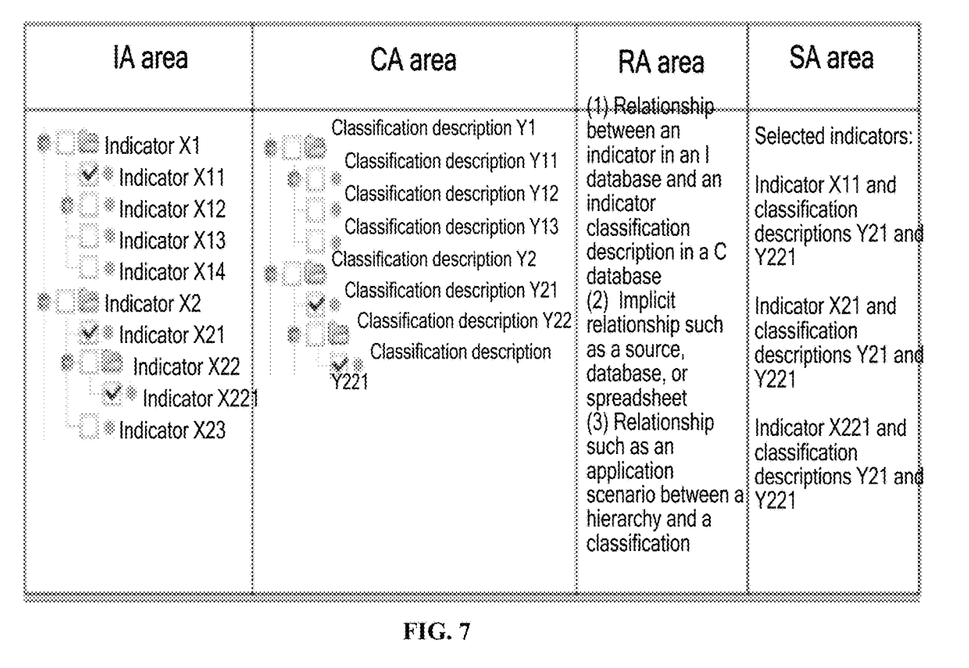
FIG. 7 is a diagram of a filled indicator index structure S' according to an embodiment.

The hierarchical tree of indicators and hierarchical tree of indicator classification descriptions in the present disclosure enable indicator hierarchies to be clarified. This visualizes distribution of indicators that correspond to different classification descriptions to facilitate user selection. In this way, required data can be selected in a faster and more accurately manner. In addition, after the indicator index structure S is filled, data meanings can be more accurately presented. A filled indicator index structure S' in this embodiment is shown in FIG. 7.

A3: Iteratively extracting information from the I, C, D, and R databases based on selections of the user by using a hierarchical classification result presentation device.

Figure 6:
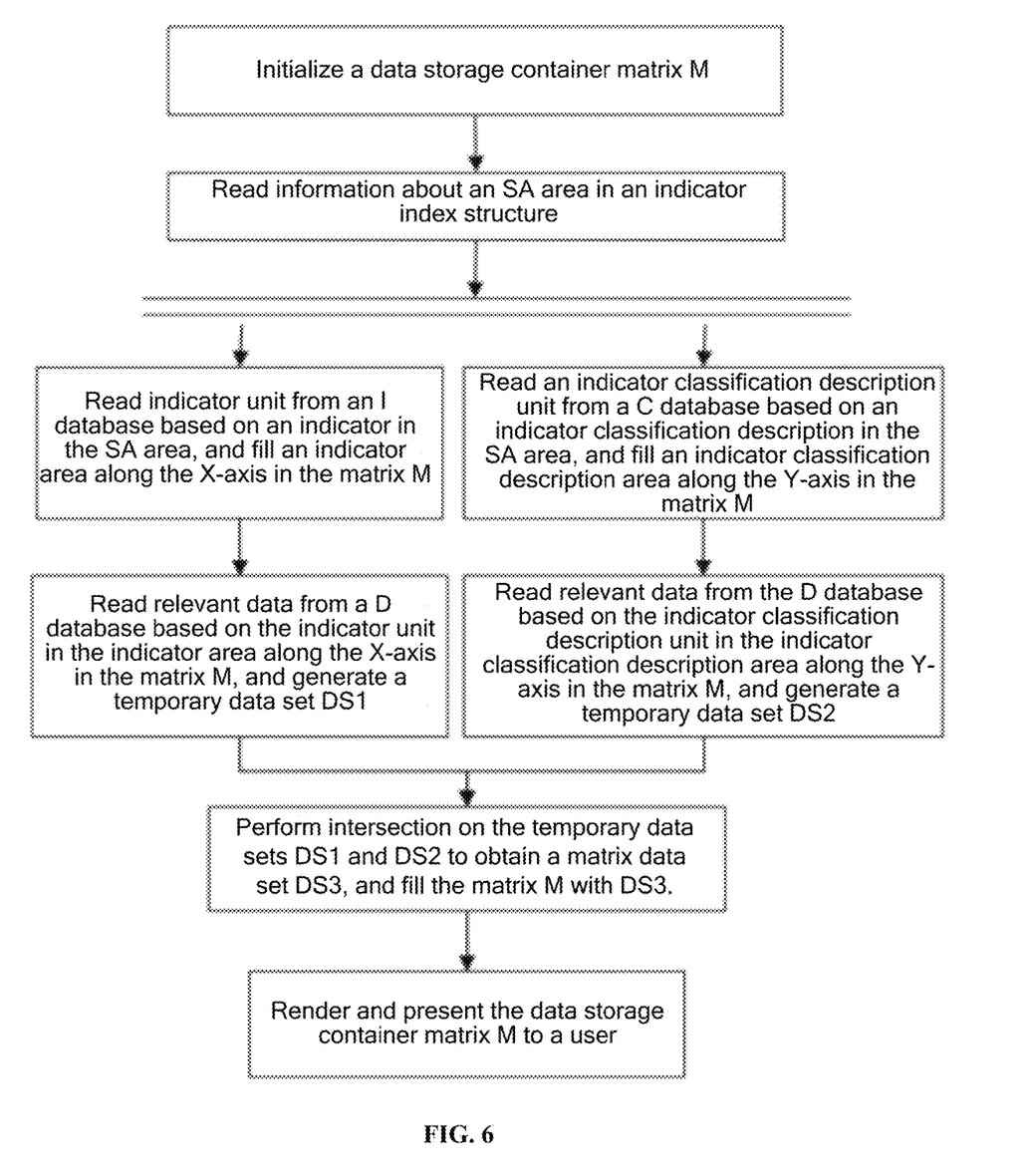
FIG. 6 is a flowchart of Step A3 according to the present disclosure.

As shown in FIG. 6, this step specifically includes the following sub steps:

A31: Initializing a data storage container matrix M.

A32: Reading information about the SA area in the indicator index structure S.

A33: Reading an indicator unit from the I database based on the indicator that is selected by the user in the SA area, and filling an indicator area along the X-axis in the matrix M with the indicator unit.

A34: Reading relevant data from the D database based on the indicator unit in the indicator area along the X-axis in the matrix M, and generating a temporary data set DS1.

A35: Reading an indicator classification description unit from the C database based on the information on the indicator classification description that is selected by the user in the SA area, and filling an indicator classification description area along the Y-axis in the matrix M with the indicator classification description unit.

A36: Reading relevant data from the D database based on the indicator classification description unit in the indicator classification description area along the Y-axis in the matrix M, and generating a temporary data set DS2.

A37: Performing intersection on the temporary data sets DS1 and DS2 to obtain a matrix data set DS3, and filling the matrix M with the matrix data set DS3.

A4: Rendering and present, to the user, the information extracted by the hierarchical classification result presentation device.

Figure 8:
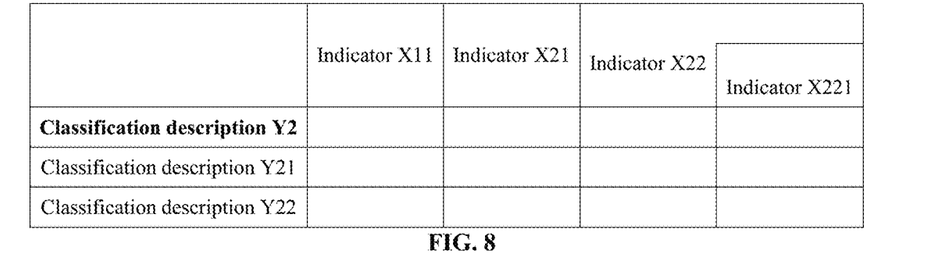
FIG. 8 is an example diagram of a spreadsheet that is finally obtained according to an embodiment.

The spreadsheet that is presented to the user in this embodiment is shown in FIG. 8. Similar to the that in FIG. 1, the presentation format in FIG. 8 accurately presents data in a two-dimensional spreadsheet.

The present disclosure uses four databases that store data information to call and present data. Users can select data as needed. Users can select one or more indicators and indicator classification descriptions from hierarchical trees. Then, the selection results can be fast presented in a spreadsheet. The spreadsheet presents relationships of data attributes neatly and clearly. Therefore, personalized selection and presentation are implemented.

What is claimed is:

1. A processing method for presenting an indicator hierarchy and classification of data in a spreadsheet, wherein the processing method is implemented based on:
a D database that stores a value;
an I database that stores an indicator unit composed of an indicator and a hierarchical relationship of the indicator, wherein the indicator is composed of an indicator name, a measurement unit, a time constraint, a space constraint, and an application constraint;
a C database that stores an indicator classification description unit composed of an indicator classification description and a hierarchical relationship of the indicator classification description, wherein the indicator classification description denotes a perspective from which an indicator is described; and
an R database that stores an application scenario, which denotes a correspondence between the indicator unit and the indicator classification description unit, and information comprising sources, databases, and spreadsheets corresponding to the two units;
the processing method comprises following steps:
A1: constructing an indicator index structure S;
A2: reading information from the I, C, D, and R databases based on selections of a user and filling the indicator index structure S by using an indicator index structure constructor;
A3: iteratively extracting information from the I, C, D, and R databases based on selections of the user by using a hierarchical classification result presentation device; and
A4: rendering and presenting, to the user, the information extracted by the hierarchical classification result presentation device;
wherein the indicator index structure S in step A1 comprises:
an indicator area, which is an IA area that presents an indicator and a hierarchical relationship between indicators;
an indicator classification description area, which is a CA area that presents an indicator classification description and a hierarchical relationship between indicator classification descriptions;
a relationship area, which is a RA area that presents an application scenario between an indicator unit and an indicator classification description unit and implicit attributes comprising a corresponding source, database, and spreadsheet; and a selected indicator area, which is a SA area that presents an indicator and an indicator classification description that are selected by the user;

wherein step A2 comprises:

A21: initializing the indicator index structure S;

A22: reading an indicator unit from the I database and filling the IA area in the indicator index structure S with the indicator unit, to form a hierarchical tree of indicators for the user to select;

A23: reading, from the R database, a relationship that corresponds to an indicator i selected by the user and filling the RA area in the indicator index structure S with the relationship, to form an application scenario r;

A24: reading an indicator classification description c from the C database based on the relationship that is read from the R database and that corresponds to the indicator i, and filling the CA area in the indicator index structure S with the indicator classification description c, to form a hierarchical tree of indicator classification descriptions for the user to select; and A25: filling the SA area in the indicator index structure S based on the indicator i, indicator classification description c, and the application scenario r that are selected by the user.

2. The processing method according to claim 1, wherein step A3 specifically comprises:

A31: initializing a data storage container matrix M;

A32: reading information about the SA area in the indicator index structure S;

A33: reading an indicator unit from the I database based on the indicator that is selected by the user in the SA area, and filling an indicator area along the X-axis in the matrix M with the indicator unit;

A34: reading relevant data from the D database based on the indicator unit in the indicator area along the X-axis in the matrix M, and generating a temporary data set DS1;

A35: reading an indicator classification description unit from the C database based on the indicator classification description that is selected by the user in the SA area, and filling an indicator classification description area along the Y-axis in the matrix M with the indicator classification description unit;

A36: reading relevant data from the D database based on the indicator classification description unit in the indicator classification description area along the Y-axis in the matrix M, and generating a temporary data set DS2; and A37: performing intersection on the temporary data sets DS1 and DS2 to obtain a matrix data set DS3, and filling the matrix M with the matrix data set DS3.

3. A processing system for presenting an indicator hierarchy and classification of data in a spreadsheet, comprising:

a processor; and a memory storing program codes, and comprising:

a D database that stores a value;

an I database that stores an indicator unit composed of an indicator and a hierarchical relationship of the indicator, wherein the indicator is composed of an indicator name, a measurement unit, a time constraint, a space constraint, and an application constraint;

a C database that stores an indicator classification description unit composed of an indicator classification description and a hierarchical relationship of the indicator classification description, wherein the indicator classification description denotes a perspective from which an indicator is described; and an R database that stores an application scenario, which denotes a correspondence between the indicator unit and the indicator classification description unit, and information comprising sources, databases, and spreadsheets corresponding to the two units, wherein the processor performs the stored program codes for:

A1: constructing an indicator index structure S;

A2: reading information from the I, C, D, and R databases based on selections of a user and filling the indicator index structure S by using an indicator index structure constructor;

A3: iteratively extracting information from the I, C, D, and R databases based on selections of the user by using a hierarchical classification result presentation device; and A4: rendering and presenting, to the user, the information extracted by the hierarchical classification result presentation device;

wherein the indicator index structure S in step A1 comprises:

an indicator area, which is an IA area that presents an indicator and a hierarchical relationship between indicators;

an indicator classification description area, which is a CA area that presents an indicator classification description and a hierarchical relationship between indicator classification descriptions;

a relationship area, which is a RA area that presents an application scenario between an indicator unit and an indicator classification description unit and implicit attributes comprising a corresponding source, database, and spreadsheet; and a selected indicator area, which is a SA area that presents an indicator and an indicator classification description that are selected by the user;

wherein step A2 comprises:

A21: initializing the indicator index structure S;

A22: reading an indicator unit from the I database and filling the IA area in the indicator index structure S with the indicator unit, to form a hierarchical tree of indicators for the user to select;

A23: reading, from the R database, a relationship that corresponds to an indicator i selected by the user and filling the RA area in the indicator index structure S with the relationship, to form an application scenario r;

A24: reading an indicator classification description c from the C database based on the relationship that is read from the R database and that corresponds to the indicator i, and filling the CA area in the indicator index structure S with the indicator classification description c, to form a hierarchical tree of indicator classification descriptions for the user to select; and A25: filling the SA area in the indicator index structure S based on the indicator i, indicator classification description c, and the application scenario r that are selected by the user.

4. The processing system according to claim 3, wherein step A3 comprises:

A31: initializing a data storage container matrix M;

A32: reading information about the SA area in the indicator index structure S;

A33: reading an indicator unit from the I database based on the indicator that is selected by the user in the SA area, and filling an indicator area along the X-axis in the matrix M with the indicator unit;

A34: reading relevant data from the D database based on the indicator unit in the indicator area along the X-axis in the matrix M, and generating a temporary data set DS1;

A35: reading an indicator classification description unit from the C database based on the indicator classification description that is selected by the user in the SA area, and filling an indicator classification description area along the Y-axis in the matrix M with the indicator classification description unit;

A36: reading relevant data from the D database based on the indicator classification description unit in the indicator classification description area along the Y-axis in the matrix M, and generating a temporary data set DS2; and A37: performing intersection on the temporary data sets DS1 and DS2 to obtain a matrix data set DS3, and filling the matrix M with the matrix data set DS3.

5. A non-transitory computer-readable storage medium having executable computer program instructions embodied therein, and further comprising:

a D database that stores a value;

an I database that stores an indicator unit composed of an indicator and a hierarchical relationship of the indicator, wherein the indicator is composed of an indicator name, a measurement unit, a time constraint, a space constraint, and an application constraint;

a C database that stores an indicator classification description unit composed of an indicator classification description and a hierarchical relationship of the indicator classification description, wherein the indicator classification description denotes a perspective from which an indicator is described; and an R database that stores an application scenario, which denotes a correspondence between the indicator unit and the indicator classification description unit, and information comprising sources, databases, and spreadsheets corresponding to the two units, wherein the computer program instructions are executable by a processor for:

A1: constructing an indicator index structure S;

A2: reading information from the I, C, D, and R databases based on selections of a user and filling the indicator index structure S by using an indicator index structure constructor;

A3: iteratively extracting information from the I, C, D, and R databases based on selections of the user by using a hierarchical classification result presentation device; and A4: rendering and presenting, to the user, the information extracted by the hierarchical classification result presentation device;

wherein the indicator index structure S in step A1 comprises:

an indicator area, which is an IA area that presents an indicator and a hierarchical relationship between indicators;

an indicator classification description area, which is a CA area that presents an indicator classification description and a hierarchical relationship between indicator classification descriptions;

a relationship area, which is a RA area that presents an application scenario between an indicator unit and an indicator classification description unit and implicit attributes comprising a corresponding source, database, and spreadsheet; and a selected indicator area, which is a SA area that presents an indicator and an indicator classification description that are selected by the user;

wherein step A2 comprises:

A21: initializing the indicator index structure S;

A22: reading an indicator unit from the I database and filling the IA area in the indicator index structure S with the indicator unit, to form a hierarchical tree of indicators for the user to select;

A23: reading, from the R database, a relationship that corresponds to an indicator i selected by the user and filling the RA area in the indicator index structure S with the relationship, to form an application scenario r;

A24: reading an indicator classification description c from the C database based on the relationship that is read from the R database and that corresponds to the indicator i, and filling the CA area in the indicator index structure S with the indicator classification description c, to form a hierarchical tree of indicator classification descriptions for the user to select; and A25: filling the SA area in the indicator index structure S based on the indicator i, indicator classification description c, and the application scenario r that are selected by the user.

6. The processing system according to claim 3, wherein step A3 comprises:

A31: initializing a data storage container matrix M;

A32: reading information about the SA area in the indicator index structure S;

A33: reading an indicator unit from the I database based on the indicator that is selected by the user in the SA area, and filling an indicator area along the X-axis in the matrix M with the indicator unit;

A34: reading relevant data from the D database based on the indicator unit in the indicator area along the X-axis in the matrix M, and generating a temporary data set DS1;

A35: reading an indicator classification description unit from the C database based on the indicator classification description that is selected by the user in the SA area, and filling an indicator classification description area along the Y-axis in the matrix M with the indicator classification description unit;

A36: reading relevant data from the D database based on the indicator classification description unit in the indicator classification description area along the Y-axis in the matrix M, and generating a temporary data set DS2; and A37: performing intersection on the temporary data sets DS1 and DS2 to obtain a matrix data set DS3, and filling the matrix M with the matrix data set DS3.

* * * * *